358-190. OR 3,692,933 SR

United States Patent

Knoll

[15] 3,692,933

[45] Sept. 19, 1972

[54] X-RADIATION PROTECTION CIRCUIT

[72] Inventor: Ronald S. Knoll, Chicago, Ill.

[73] Assignee: Admiral Corporation, Chicago, Ill.

[22] Filed: Oct. 28, 1970

[21] Appl. No.: 84,841

[52] U.S. Cl. ....................178/7.5 R

[51] Int. Cl. ....................H04n 5/68

[58] Field of Search......178/7.3 R, 7.5 R, 7.3 DC, 7.5 DC

[56] References Cited

UNITED STATES PATENTS

| | | | |
|---|---|---|---|
| 3,546,536 | 12/1970 | Umin | 178/7.3 R |
| 2,892,028 | 6/1959 | Pritchard et al. | 178/7.3 R |
| 3,179,743 | 4/1965 | Ahrons et al. | 178/7.5 R X |
| 3,202,865 | 8/1965 | Stark, Jr. | 178/7.5 R X |
| 3,560,650 | 2/1971 | Hofmann | 178/7.5 R |
| 3,569,621 | 3/1971 | Krug | 178/7.5 R |
| 3,576,946 | 5/1971 | Frizane | 178/7.3 R |

*Primary Examiner*—Robert L. Richardson
*Attorney*—Hill, Sherman, Meroni, Gross & Simpson

[57] ABSTRACT

A protective circuit is disclosed which is adapted to detect and indicate an overvoltage condition in a television receiver by blanking both sound and picture information. The circuit is coupled between an output of the receiver's high voltage transformer and an input of the receiver's automatic gain control (AGC) system. The normal input signal to the AGC circuit is a video information component of a broadcast television signal selected by the tuner and amplified. The AGC system normally responds to the varying signal strength of the synchronizing signal information of the video signal to control the gain of the receiver's tuner and IF amplifier sections. Should the output of the receiver's high voltage transformer rise above a predetermined level, the protective circuit generates a failure signal which causes the AGC system to cut off signal flow through the tuner and IF sections, thus terminating both audio and video reproduction by the receiver.

10 Claims, 3 Drawing Figures

INVENTOR
Ronald S. Knoll
by Pendleton, Neuman, Williams and Anderson Att'ys

X-RADIATION PROTECTION CIRCUIT

BACKGROUND OF THE INVENTION

This invention is directed to a protective circuit for use in a television receiver. More particularly the circuit prevents operation of the television receiver at a voltage greater than its maximum design voltage.

Some color television receivers require very high operating voltages, as much as 25 kilovolts for the final accelerating anode of the color cathode ray tube. Should the receiver's operating voltage rise to a level higher than that for which the set is designed, the rate of X-radiation emission may exceed a predetermined maximum tolerable level. Therefore, a color receiver should not be operated at a voltage greater than its design voltage.

A rise in operating voltage may be caused by the failure of the high voltage regulating element, or by a serviceman's improper adjustment of the receiver. In any case, the rise of operating voltage is difficult to detect, for the set may continue to operate normally; in fact, the receiver operation may even be improved due to the increased picture brightness.

SUMMARY OF THE INVENTION

It is an object of this invention to provide a circuit for detecting an overvoltage condition in a television receiver and for terminating picture translation in response thereto.

It is another object of this invention to provide an overvoltage protection circuit including means for sampling the high voltage output of the receiver and for developing an AGC cutoff signal in the event this output rises above a predetermined level.

Further objects and advantages of this invention will be apparent from the description, the drawings and the appended claims.

The overvoltage protection circuit of this invention samples an output of the high voltage transformer to determine the high voltage level of the set. The protection circuit then develops a control signal which is coupled to an input of the automatic gain control (AGC) circuit of the television receiver. The AGC circuit normally develops a gain controlling variable bias signal which limits the gain of the receiver's tuner and IF amplifier circuits in proportion to the strength of a synchronizing signal component of a broadcast television signal selected by the tuner and applied to the AGC input. Should the high voltage output rise above a fixed level, the output signal of the protection circuit overrides the synchronizing signal. In response to this increased input signal, the AGC circuit limits the gain of the tuner and IF amplifier to such a degree that no information is passed to the television receiver's cathode ray tube, thereby terminating audio and video reproduction. When the overvoltage condition is terminated, normal picture reproduction is resumed.

IN THE DRAWING

Figure 1:
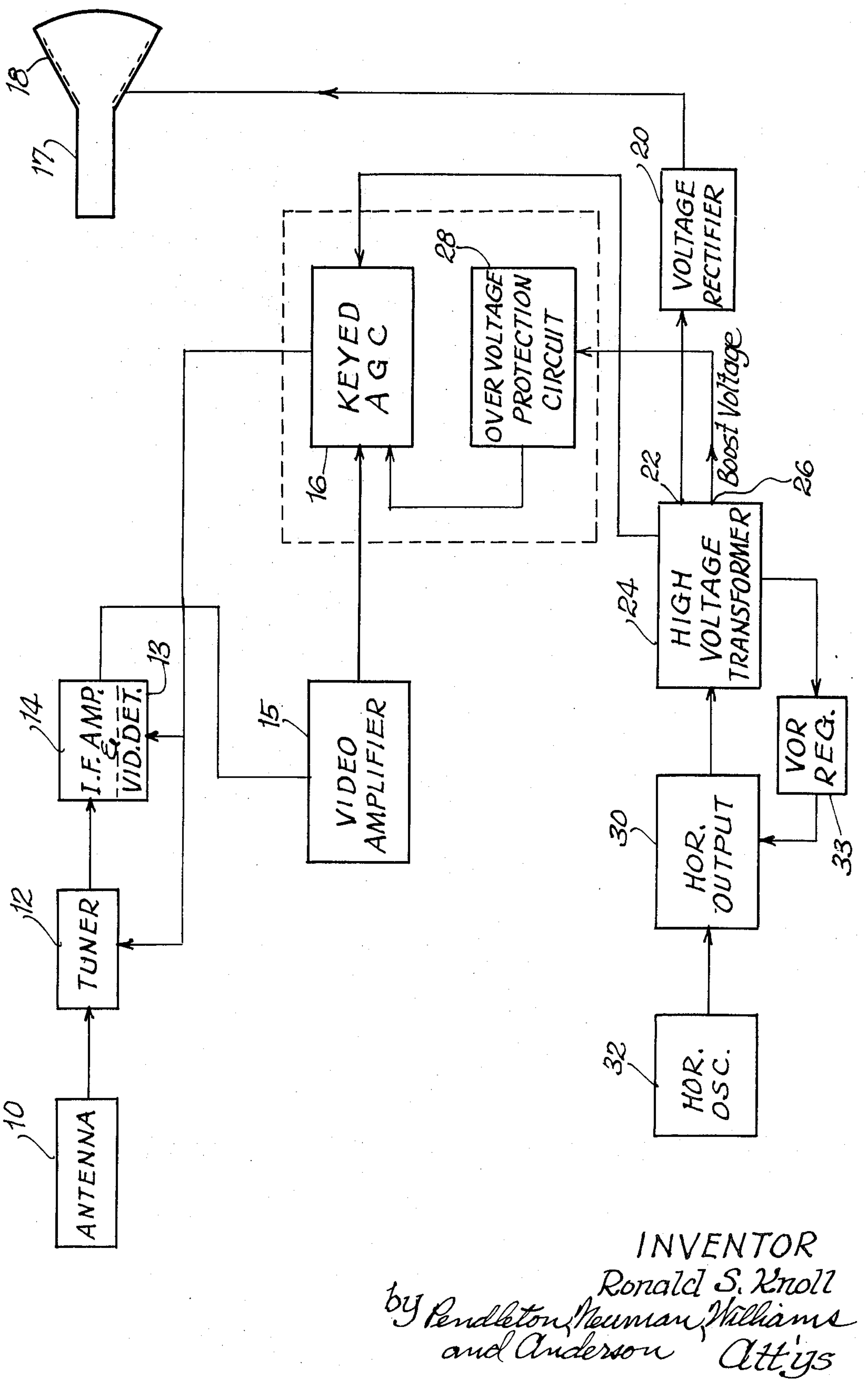
FIG. 1 is a block diagram of a portion of a television receiver employing the overvoltage protective circuit of this invention.

Referring now to FIG. 1, only that portion of a television receiver necessary to describe the present invention is shown. The broadcast television signal received by the antenna 10 consists of RF carriers modulated with audio and video color information. The tuner 12 generally comprises circuitry for amplifying this (RF) signal and for heterodyning it with a locally generated oscillatory signal to develop an intermediate frequency signal. The IF amplifier 14 amplifies the intermediate frequency signal and the video detector 13 "second detects" to produce video information (including synchronizing signal information which is the real indicator of signal strength), modulated audio information and modulated color information. A video amplifier 15 couples this video information to the input of a keyed AGC circuit 16. The output of the keyed AGC circuit 16 is returned to the tuner 12 and IF amplifier 14.

The output signal supplied by the AGC circuit to the tuner 12 and IF amplifier 14 varies with the amplitude of this synchronizing signal. In response to a large amplitude signal, the AGC system reduces the gain of the controlled amplifiers of the tuner and IF stages. For a signal of small amplitude, the output of the AGC circuit increases the gain of these amplifier stages. Therefore, due to the AGC circuit, the tuner and IF amplifier output signals maintain a relatively constant magnitude in spite of input signal variation.

The television receiver further includes a high voltage transformer 24 having an output 22 connected to an ultor anode 18 through a high voltage rectifier 20. Another output 26 of the high voltage transformer is connected to an overvoltage protection circuit, indicated generally at 28. The transformer's boost voltage output 26 provides a sampled high voltage input signal to the protection circuit. The input to the transformer 24 is connected to a horizontal output tube 30 driven by a horizontal oscillator 32. A VDR regulating element 33 controls the horizontal output tube 30. The overvoltage protection circuit 28 of this invention, however, samples only the output of the high voltage transformer 24 and develops an AGC cutoff signal in the event this output rises above a predetermined level. The particular type of regulating device is not important, and, in fact, no regulator is required in view of the operation of the protection circuit.

The ultor anode 18 provides the final accelerating potential to the tube beam current. This anode is operated at a very high operating voltage, on the order of 25 KV, which is supplied by the high voltage transformer 24. The input to the high voltage transformer is controlled by the voltage regulating element 33. Should some failure occur in the voltage regulating element, the output of the high voltage transformer supplied to ultor anode 18 may rise above the predetermined maximum operating level. In the ordinary television receiver, the level of X-radiation emission by tube 17 may then exceed prescribed levels. Other elements of the receiver, such as the voltage rectifier 20, may also emit X-rays when subjected to excessively high voltage.

However, in the receiver described herein, a concomitant increase in the voltage at boost voltage output 26 also occurs, triggering the protection circuit 28 of this invention. The magnitude of the output signal of the triggered protection circuit 28 is sufficient to override the normal input signal to keyed AGC circuit 16.

In response to this increased signal level, the magnitude of the gain controlling feedback signal from the AGC circuit 16 also increases. The magnitude of this feedback signal, as applied to tuner 12 and amplifier 14, is enough to reduce the gain of these stages to about zero, cutting off the flow of video signals through the television receiver to the picture tube. A viewer is thereby left with no recourse except to turn off his television receiver, thereby terminating the excessive X-radiation emission. The set can be restored to normal operation only by making the adjustments and replacements necessary to reduce the high voltage to its normal operating level.

Figure 2:
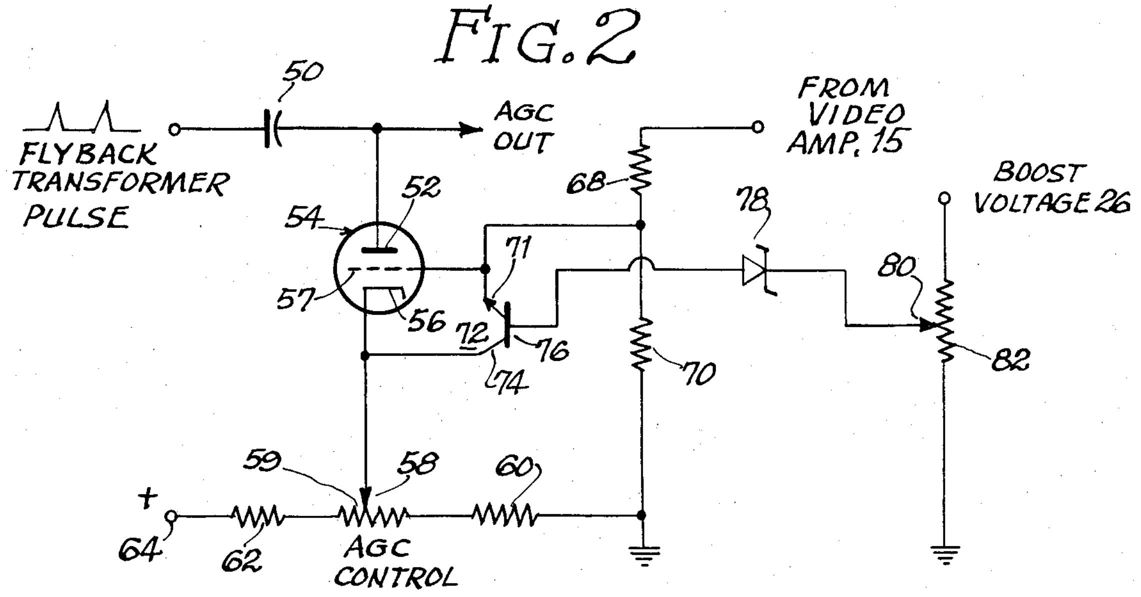
FIG. 2 is a schematic diagram of an embodiment of the overvoltage protective circuit of this invention.

FIG. 2 is a schematic diagram of an overvoltage protection circuit designed in accordance with this invention, and selected elements of a keyed AGC circuit of a television receiver. The AGC circuit includes a capacitor 50 for coupling the output of the high voltage transformer 24 (FIG. 1) to the plate 52 of AGC keyer triode 54. The triode 54 is illustrated as a distinct vacuum tube for purposes of illustration; it may, of course, be part of a larger tube envelope. The cathode 56 of the triode 54 is connected to a fixed source of positive potential 64 through a pickoff arm 58 of a potentiometer 59 having one end connected to ground through a resistor 60 and the other end connected through a resistor 62 to the potential source 64. The control grid 57 of triode 54 is connected to the output of the video amplifier 15 (FIG. 1) through a voltage divider including resistors 68 and 70. The grid 57 is also connected to an emitter 71 of a transistor 72 of the overvoltage protection circuit. The transistor's base 76 is connected through a series zener diode 78 to a tapping arm 80 of a potentiometer 82 in shunt across the boost voltage output 26. The boost voltage is proportional to the high voltage applied to the ultor anode 18, the voltage to be monitored. The transistor's collector 74 is connected to the cathode 56 of the triode 54, placing the transistor's emitter-collector circuit in shunt across the grid-cathode circuit of the keyer tube. The state of this emitter-collector circuit is conductive or nonconductive, depending on the rate of base current flow through zener diode 78. Potentiometer 82 is adjusted so that under normal operating conditions the voltage across zener diode 78 does not exceed its breakdown voltage and no current flows into the base of transistor 72, holding the transistor cutoff. Under this bias condition, the emitter-collector circuit of transistor 72 presents a high grid-to-cathode impedance across tube 54 and has a negligible effect on the tube bias.

The grid 57 of AGC keyer tube 54 is normally biased negative with respect to the cathode 56 by a signal taken from the plate of video amplifier 15 (FIG. 1) which carries a video signal including a synchronizing signal component. The DC bias voltage of cathode 56 is established by potentiometer 59. The horizontal flyback pulse output of the flyback transformer is coupled by the capacitor 50 to the plate 52 of tube 54. Because of the bias condition of the tube, each flyback pulse turns the tube partially on. A weak video signal including a synchronizing signal of low magnitude holds the grid negative, and the tube is barely turned on by the flyback pulse. The plate potential, which is of low negative magnitude, determines the magnitude of the AGC bias voltage applied to the control grids of the tuner 12 and IF amplifier 14. A plate potential of low magnitude limits the gain very slightly. If a strong video signal is being applied to the grid 57 by the video amplifier 15, the grid is held more positive. Therefore, the tube conducts harder, causing the plate to swing more negative when the flyback pulse is received, and the tuner and IF amplifier gains to be reduced as compared to their weak signal levels.

The failure mode operation of the overvoltage protection circuit 28 is initiated by an increase in the output of the high voltage transformer 22 and a concomitant increase in the voltage at boost voltage output 26. The signal applied by potentiometer 82 to zener diode 78 exceeds its breakdown voltage, causing the diode to conduct. The bias voltage applied to the base 76 of transistor 72 also rises so that the base is positive with respect to the emitter 71, turning the transistor on.

The grid 57 of the keyer triode 54 is now effectively shorted to the cathode 56 through the collector-emitter circuit of transistor 72 so that the triode 54 operates at zero bias. Thus each horizontal flyback pulse turns the triode sharply on. Because the tube 54 now conducts heavily, only a small part of the voltage of each horizontal pulse is dropped across the tube, and a negative voltage of considerable magnitude builds up across capacitor 50. Thus the control grids of the tuner and IF amplifiers, which are connected to capacitor 50, swing so sharply negative that the active elements of the amplifiers are biased out of conduction, cutting off all signal flow through these stages to the television receiver.

The following table of component values for the circuit of the schematic diagram of FIG. 1 is disclosed for the purpose of illustration only and is not intended to be limiting in any way:

| | |
|---|---|
| CAPACITOR | |
| C 50 | 470 Picofarads |
| RESISTORS | |
| R 82 | 1.3 Megohms |
| R 70 | 100 Kilohms |
| R 68 | 220 Kilohms |
| R 60 | 27 Kilohms |
| R 62 | 100 Kilohms |
| Voltage Source 64 | 280 Volts |
| AGC Keyer Tube 54 | 1/3 11BT11 |
| Zener Diode 78 | IN 5281 (200$^v$) |
| Transistor 72 | SE 1001 |

Figure 3:
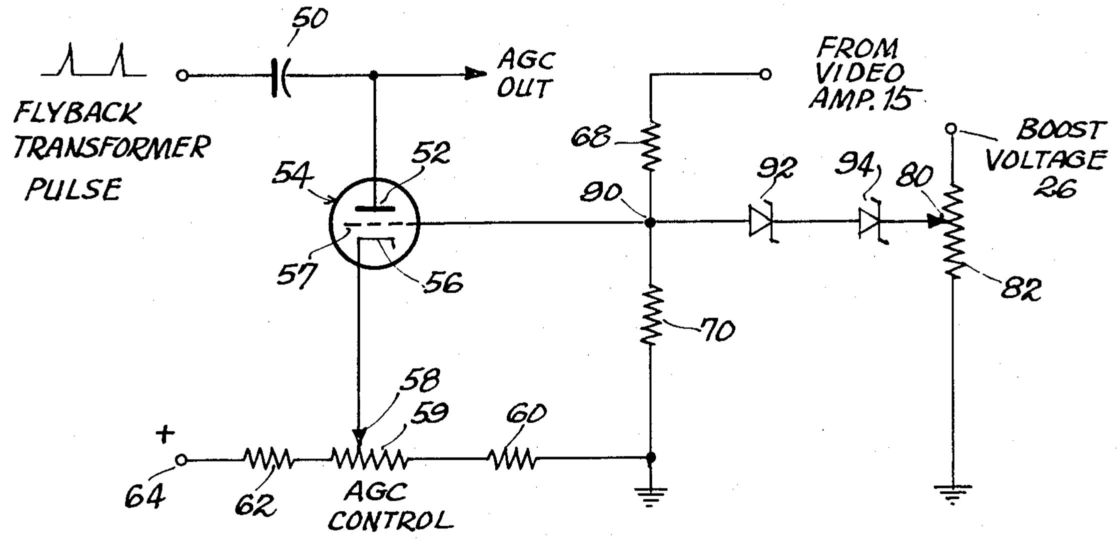
FIG. 3 is a schematic diagram of an alternative embodiment of the invention.

In the embodiment disclosed in the schematic diagram of FIG. 3, the grid 57 of AGC keyer triode 54 is connected to the potentiometer 82 which samples the voltage at boost voltage output 26 through serially connected zener diodes 92 and 94. The tapping arm 80 of potentiometer 82 is adjusted so that in normal operation with a properly regulated voltage applied to the high voltage transformer, the potential difference across zener diodes 92 and 94 is only slightly less than the sum of the diode breakdown voltages, holding them out of conduction. The grid 57 of triode 54 is also coupled to a junction 90 between two resistors 68 and 70. The resistors are selected to establish a negative grid-to-cathode bias on the triode 54 for normal levels of video input signals. The normal mode of operation is in all other respects the same as described for the circuit of FIG. 2.

In the failure mode of operation, the voltages at the transformer outputs, including the boost voltage output 26, rise. The proportional increase in voltage at the tapping arm 80 of potentiometer 82 causes the zener diodes to break down, and the voltage at the grid 57 of the keyer tube 54 increases. The grid potential shifts from being negative with respect to the cathode 56 to positive, turning the triode 57 on. The tube is now biased heavily into a conductive state presenting only a small resistance to each large amplitude horizontal flyback pulse applied to plate 52. Thus each horizontal flyback pulse charges the capacitor to a large negative potential. This potential applied to the control inputs of the active elements of the tuner 12 and IF amplifier 14 stages biases these elements to the cutoff state, terminating signal flow through the tuner and amplifier sections.

The component values for an exemplary embodiment of the circuit of this invention are the same as the components of the circuit of FIG. 2, with the following exceptions:

Zener Diodes 92, 94 IN 5271 ($200^v$)

These component values are listed for the purpose of illustration only and not intended to be limiting in any way. A single zener diode of twice the voltage rating could be used in place of these two series-connected diodes.

While two particular embodiments of this invention are shown and described, it will be understood, of course, that the invention is not limited thereto since many modifications may be made. For example, the voltage breakdown devices are disclosed as zener diodes; other breakdown devices may be used in their place without departing from the scope of this invention. It should be noted, however, that the breakdown device preferably exhibits a symmetrical volt-ampere characteristic in the breakdown range. That is, it should return to its normal high resistance state when the applied voltage falls below the established breakdown voltage. Momentary bursts of high voltage do occur, such as when changing channels, which might otherwise unduly interfere with normal receiver operation.

It should also be understood that transistors could replace the tubes which are used in the disclosed embodiments of FIGS. 2 and 3 by changing the biasing arrangements.

While particular embodiments of the invention have been shown, it is to be understood that the invention is not limited thereto, since many other minor modifications may be made which fall within the true spirit and scope of the invention.

The invention having thus been described, what is claimed and desired to be covered by Letters Patent is:

1. In a cathode ray tube image reproducing system including a high voltage supply wherein a broadcast television signal including a video signal component is translated through amplifier stages having controlled gain characteristics, the combination comprising: means for sampling an operating voltage output of said high voltage supply and for developing a monitoring signal proportional thereto, gain control means responsive to the strength of said video signal component for controlling the gain of said amplifier stages, and overvoltage protection means coupled to said gain control means and responsive to said sampling means for controlling said gain control means to limit the gain of said amplifier stages when said operating voltage exceeds a predetermined level thereby effectively preventing signal amplification by said amplifier stages and providing an indication of system malfunction.

2. The device of claim 1 wherein said gain control means includes a controlled conductance element coupled to said overvoltage protection means having a first operating state when said operating voltage is less than said predetermined operating voltage level wherein the conductance of said element is determined by the strength of said signal and having a second operating state when said operating voltage exceeds said predetermined level wherein the conductance of said element is determined by the magnitude of the monitoring signal.

3. The device of claim 1 wherein said overvoltage protection means includes voltage breakdown means coupled between said sampling means and said gain control means, said voltage breakdown means being adapted to couple said monitoring signal to said gain control means upon being rendered conducting by said monitoring signal when the operating voltage of the system exceeds a predetermined level.

4. The device of claim 3 wherein said gain control means includes a vacuum tube having a grid, plate and cathode, the cathode being connected to a source of constant potential, the plate being connected to said amplifier stages and the grid being coupled to said video signal and connected through said voltage breakdown means to said sampling means so that the conductance of said vacuum tube is a function of the magnitude of said video signal for operating voltages less than said predetermined level, the conductance being controlled by said monitoring signal when the operating voltage of the system exceeds a predetermined level.

5. The device of claim 3 wherein said voltage breakdown means is characterized by a substantially symmetrical volt-ampere characteristic in the region of the breakdown voltage and is adapted to restore normal operation of the receiver following a momentary high voltage surge.

6. The device of claim 1 wherein said overvoltage protection means includes switch means coupled to said gain control means for selectively applying said video signal and the monitoring signal output of said sampling means to said gain control means.

7. The device of claim 6 wherein said switch means includes a transistor having a first electrode coupled to said gain control means, a second electrode coupled to a source of constant potential and a control electrode coupled to said sampling means, said transistor being normally biased off and adapted to be biased on by the monitoring signal from said sampling means indicating an operating voltage in excess of said predetermined level.

8. The device of claim 7 wherein said gain control means includes a vacuum tube having a grid, plate and cathode, the cathode being coupled to said amplifier stages, said grid and plate being connected to the first and second electrodes of said transistor so that said vacuum tube has a first operating state wherein its conductance is controlled by the magnitude of said video signal and a second operating state when said operating voltage exceeds said predetermined level wherein the conductance of said vacuum tube is controlled by the magnitude of said monitoring signal.

9. The device of claim 7 wherein said overvoltage protection means includes voltage breakdown means coupled between said signal developing means and said control electrode and having a breakdown voltage adapted to establish said predetermined level of operating voltage.

10. The device of claim 9 wherein said voltage breakdown means is characterized by a substantially symmetrical volt-ampere characteristic in the region of the breakdown voltage and is adapted to restore normal operation of the receiver following a momentary high voltage surge.

* * * * *